(12) United States Patent
Curatola et al.

(10) Patent No.: US 8,823,443 B2
(45) Date of Patent: Sep. 2, 2014

(54) CHARGE-PUMP CIRCUIT

(75) Inventors: Gilberto Curatola, Korbek-Lo (BE); Youri Victorovitch Ponomarev, Leuven (BE)

(73) Assignee: NXP B.V., Eindhoven (NL)

( * ) Notice: Subject to any disclaimer, the term of this patent is extended or adjusted under 35 U.S.C. 154(b) by 117 days.

(21) Appl. No.: 13/133,246

(22) PCT Filed: Dec. 17, 2009

(86) PCT No.: PCT/IB2009/055812
§ 371 (c)(1),
(2), (4) Date: Jun. 7, 2011

(87) PCT Pub. No.: WO2010/070603
PCT Pub. Date: Jun. 24, 2010

(65) Prior Publication Data
US 2011/0241767 A1    Oct. 6, 2011

(30) Foreign Application Priority Data

Dec. 18, 2008   (EP) ................................. 08172166

(51) Int. Cl.
*G05F 1/10* (2006.01)
*G05F 3/02* (2006.01)
(52) U.S. Cl.
USPC ........................................................ 327/536
(58) Field of Classification Search
USPC ...................................... 327/536; 363/59–60
See application file for complete search history.

(56) References Cited

U.S. PATENT DOCUMENTS

| | | | |
|---|---|---|---|
| 6,413,802 B1 * | 7/2002 | Hu et al. | 438/151 |
| 6,747,897 B2 * | 6/2004 | Karaki | 365/185.18 |
| 6,809,498 B2 | 10/2004 | Nakamura et al. | |
| 7,167,090 B1 * | 1/2007 | Mandal et al. | 340/538.14 |
| 7,580,694 B2 * | 8/2009 | Rizzo et al. | 455/333 |
| 8,241,970 B2 * | 8/2012 | Cohen et al. | 438/150 |
| 2002/0084829 A1 | 7/2002 | Li | |
| 2006/0028854 A1 | 2/2006 | Kawai | |

(Continued)

FOREIGN PATENT DOCUMENTS

| | | |
|---|---|---|
| CN | 1734907 A | 2/2006 |
| EP | 0813290 A2 | 12/1997 |

(Continued)

OTHER PUBLICATIONS

"Smart Cards; UICC—Contactless Front'End (CLF) Interface; Host Cotnrolelr Itnerface (HCI), Release 7, ETSI TS 102 622", ETSI Standard, European Telecommunications Standards Institute, Sophia, Antipolis CEDEX, FR, vol. SCP-6, No. V7.2.0 (Sep. 1, 2008).

(Continued)

*Primary Examiner* — Quan Tra (57) ABSTRACT

A charge-pump circuit a plurality of transistor stages connected in series between a supply voltage input node and a boosted voltage output node, wherein at least one transistor stage comprises a multiple-gate transistor, which transistor comprises at least two gates, of which one is a first gate for switching the transistor on or off according to a voltage applied to the first gate, and one is an additional second gate for controlling the threshold voltage of the multiple-gate transistor, independently of the first gate, according to a control voltage applied to the second gate.

11 Claims, 4 Drawing Sheets

(56) References Cited

U.S. PATENT DOCUMENTS

| | | | |
|---|---|---|---|
| 2007/0047364 A1* | 3/2007 | Chuang et al. | 365/226 |
| 2007/0132435 A1 | 6/2007 | Hasegawa et al. | |
| 2007/0176671 A1 | 8/2007 | Ishida | |
| 2007/0189060 A1 | 8/2007 | Inaba | |
| 2008/0153450 A1 | 6/2008 | Atsumi et al. | |

FOREIGN PATENT DOCUMENTS

| | | | |
|---|---|---|---|
| JP | 08125133 A | 5/1996 | |
| WO | 2007/052994 A1 | 5/2007 | |
| WO | 2009/047715 A1 | 4/2009 | |

OTHER PUBLICATIONS

GSMA; "Mobile NFC Technical Guidelines—Version 2.0", Internet Citiation http://www.gsmworld.com/documents/nfc/gsma_nfc2_wp.pdf (Nov. 1, 2007).

International Search Report for Application PCT/IB2009/055135 (Aug. 10, 2010).

Jieh-Tsorng, Wu et al.; "MOS Charge Pumps for Low-Voltage Operation"; IEEE Journal of Solid-State circuits, IEEE Service Center, vol. 33, No. 4; 6 pages; Apr. 1, 1998.

International Search Report, PCT/IB2009/055182, Dec. 17, 2009.

* cited by examiner

CHARGE-PUMP CIRCUIT

FIELD OF THE INVENTION

The invention describes a charge-pump circuit and a method of boosting a voltage using a charge-pump circuit.

BACKGROUND OF THE INVENTION

Charge-pumps are circuits that can pump charge upward to produce voltages higher than the regular supply voltage, using capacitors to store energy between stages. Charge is transferred from one stage to the next, usually by means of a chain of diodes. In low-voltage applications, the 'diodes' in the chain are generally MOSFETs (metal-oxide semiconductor field-effect transistors) connected so that charge can only flow in one direction, i.e. so that the transistors act as diodes having a certain forward bias voltage. Charge-pumps using semiconductor technology are used extensively in memories and in many power-management integrated circuits. Another important field of use of such charge-pump circuits is in passive RFID (radio-frequency identifier) tags where the AC voltage received by the tag's transceiver is first converted to a DC voltage and then 'pumped' or boosted to a level required by circuitry in the tag.

A type of semiconductor charge-pump circuit commonly used is the Dickson's charge-pump, which uses a chain of diode transistor stages along which the charge is pumped, and a capacitor at the output of each stage to store the charge. Here, the term 'transistor stage' refers to a distinct circuit configuration, for example the diode transistor and capacitor, which is repeated in the chain. Other circuit elements such as an additional transistor and optionally a capacitor to reduce voltage ripple may be connected between the final transistor stage and the output voltage node. A supply voltage is applied to the first stage, and control signals or 'pumping clocks' are applied to 'pump' charge onto the capacitors. The output at the final transistor or transistor stage is the 'boosted' voltage.

The output voltage that can ultimately be achieved by the charge pump—the voltage gain—depends on a number of factors besides the input voltage, for example the number of transistor stages used, the voltage gain of each transistor stage, the output load, and the current consumed. In conventional circuits, the voltage gain over each stage, or single-stage gain, is limited to a certain extent by the threshold voltage of the transistor. In a typical MOSFET, the threshold voltage can be about 0.3-0.4V. The efficiency of such state-of-the-art circuits is usually only about 18%-20%. As long as the supply voltage and pumping clock voltage levels are considerably greater than the threshold voltage, a satisfactory output voltage can be obtained. However, for low-voltage applications where the supply voltage is not much greater than the threshold voltage, the Dickson charge-pump becomes quite unsuitable since its single-stage gain is then negligible.

In an alternative approach, described in the paper "MOS Charge Pumps for Low-Voltage Operation" (Wu, Chang; IEEE Journal of Solid-State Circuits, Vol. 33, No. 4, April 1998), a charge-pump circuit using charge-transfer switches (CTS) in addition to diode transistors is used to give a higher single-stage gain, since the charge transfer in this circuit is independent of the threshold voltage. However, this type of circuit also has its limitations, namely reverse charge leakage over the charge-transfer switches, which results in a lower boosted output voltage. To overcome this, an additional pair of transistors must be included for each boosting stage in order to completely turn off the charge-transfer switch transistors, resulting in a correspondingly complex circuitry and increased power dissipation.

SUMMARY OF THE INVENTION

It is an object of the invention to provide an alternative charge-pump circuit that overcomes the problems mentioned above.

The object of the invention is achieved by the charge-pump circuit according to claim 1, and by the method of boosting a voltage using a charge-pump circuit according to claim 13.

The charge-pump circuit according to the invention comprises a supply voltage input node for applying an input voltage to be boosted, a boosted voltage output node for outputting a boosted voltage, and a plurality of transistor stages connected in series between the supply voltage input node and the boosted voltage output node. In the charge-pump circuit according to the invention, at least one transistor stage comprises a multiple-gate transistor, which transistor comprises at least two gates, of which one is a first gate for switching the transistor on or off according to a voltage applied to the first gate, and one is an additional second gate for controlling the threshold voltage of the multiple-gate transistor, independently of the first gate, according to a control voltage applied to the second gate.

The term 'multiple-gate' or 'multigate' transistor refers to a transistor such as a field-effect transistor having at least two gate electrodes or terminals that may be controlled independently of each other. Such transistors are the result of research effort to find a solution to the physical limitations of planar transistors due to short-channel effects in sub-micron, e.g. 32 nm, technologies. In a multiple-gate device, the gates are realised on multiple surfaces around the channel, allowing a miniaturized realisation with effective suppression of leakage current.

By independently driving two gates of the multigate transistor, it is possible to dynamically control the threshold voltage of the device. In particular, if one gate is used as "normal" control gate to turn on and off the transistor while the voltage applied on the second gate is varied, it is possible to electrically tune the transistor performance and to change its threshold voltage accordingly. For example, when a high voltage is applied to a first gate in order to switch on the transistor in the usual manner, a low voltage applied to the second gate results in a decrease in threshold voltage, allowing more charge to be transferred across the transistor. On the other hand, when a low voltage is applied to the first gate in order to switch off the transistor in the usual manner, a high voltage applied to the other gate results in an increase in threshold voltage and hence this transistor can be properly switched off. An advantage of the charge-pump circuit according to the invention therefore, is that it may be used in low-power applications where other, conventional charge-pump designs fail due to problems associated with threshold voltage or charge leakage.

Another advantage of the charge-pump circuit according to the invention is that the ability to increase or decrease the threshold voltage as required allows a greater single-stage gain to be achieved for a transistor stage comprising a multiple-gate transistor, while also making it possible to properly turn off that transistor. Compared to conventional circuits, therefore, the charge-pump circuit according to the invention may deliver an improvement in efficiency of a factor of up to two (2).

The method according to the invention of boosting a voltage uses a charge-pump circuit comprising a plurality of transistor stages connected in series between a supply voltage input node and a boosted voltage output node, wherein at least one transistor stage comprises a multiple-gate transistor with at least two gates, of which one is a first gate for switching the transistor on or off according to a voltage applied to the first gate, and one is an additional second gate for controlling the threshold voltage of the multiple-gate transistor, independently of the first gate, according to a control voltage applied to the second gate. The method comprises applying an input voltage to be boosted at the supply voltage input node, applying a control voltage to the second gate of the multiple-gate transistor to control the threshold voltage of the multiple-gate transistor, and outputting the boosted voltage at the voltage output node.

The dependent claims and the subsequent description disclose particularly advantageous embodiments and features of the invention.

A charge-pump circuit may also sometimes be referred to as a 'charge-booster' circuit. These terms may therefore be used interchangeably in the following, without restricting the invention in any way.

As indicated above, using a multiple-gate transistor allows dynamic adjustment of the threshold voltage for that transistor such that the single-stage gain in a charge-pump may be improved if that stage uses a multiple-gate transistor to transfer charge. Therefore, in a particularly preferred embodiment of the invention, each transistor stage of the charge-pump circuit preferably comprises a multiple-gate transistor with a second, independently controllable gate. In such a circuit, each transistor stage has an improved single-stage gain such that the overall charge-pump circuit may deliver an improved boosted output voltage compared to prior art charge-pump circuits. In brief, such a preferred embodiment is free of the constraints due to threshold voltage considerations to which prior-art charge pump circuits are subject.

As mentioned above, recent developments in semiconductor manufacturing techniques have led to realizable multiple-gate MOSFETs. Devices with three or more independently controllable gates are conceivable. For the purposes of the charge-pump according to the invention, however, a second independently controllable gate is sufficient. Therefore, the multiple-gate transistor with independent gate used in the charge-pump circuit according to the invention preferably comprises a double-gate FinFET transistor such as a 4-terminal FinFET, i.e. a MOSFET having a source terminal, a drain terminal, and two gate terminals which can be controlled independently of each other. To avoid confusion, the term 'first gate' when used in the following is intended to refer to a gate to which a voltage is applied in order to switch the transistor on or off in the usual manner, while the terms 'second gate' (also called 'independent gate' in the following) refers to the other gate terminal, to which a voltage may be applied with the effect of increasing or decreasing the threshold voltage of the transistor.

One of the reasons for the relatively low efficiency of a conventional charge pump circuit is given by substrate losses, as will be known to the skilled person. In a further preferred embodiment of the charge-pump circuit according to the invention, therefore, the advantages of silicon-on-insulator (SOI) technology can be made use of by implementing SOI FinFET devices. Besides the advantages mentioned already, such a circuit is further characterised by a significant reduction in substrate losses, since the presence of an isolation layer, also called a "BOX" layer, in the substrate can considerably improve the efficiency of the charge-pump circuit.

In a charge-pump circuit with diode-connected transistor stages, charge is transferred from a transistor stage input to a transistor stage output if the potential at the input of a stage is greater than the potential at the output. The potential at alternate transistor stage input nodes is usually increased by applying a control voltage to those nodes. Therefore, in a particularly preferred embodiment of the invention, the first and second control voltages comprise essentially square-wave signals of opposite phase such that the potential at alternate transistor stage input nodes can be increased uniformly and rapidly.

As already indicated, when a transistor is conducting, a low threshold voltage is preferable. On the other hand, when the transistor should not conduct, i.e. when it is turned off, a high threshold voltage is preferable. In a charge-pump circuit of the types considered here, the transistors in neighbouring transistor stages are alternately turned on and off, so that alternate transistor stages have a higher input potential, i.e. a higher source voltage. The expression 'alternate transistors' is used here in the sense of 'every other transistor' or 'every second transistor'. However, in conventional MOSFETS, when the source voltage increases, the threshold voltage also increases, resulting in less charge transfer. On the other hand, when the MOSFET is turned 'off', the threshold voltage decreases so that a certain amount of current can 'leak' back through the transistor. This is referred to as the 'body effect' of the transistor, and is largely responsible for the limitations in performance of conventional charge-pump circuits.

In the method according to the invention, the control voltage is not only applied to transistor stage input nodes, but is also applied selectively to dynamically control the threshold voltage of the multiple-gate transistors in the transistor stages. Since the control voltage is essentially a square wave, it basically has two levels, namely 'off and' 'on', where 'off' corresponds to a zero voltage value, and 'on' corresponds to the upper voltage value of the control input. In a further preferred embodiment of the invention, the first control voltage input node is connected to the independent gates of the double-gate transistors of alternate transistor stages for applying a first control voltage to dynamically control the threshold voltage of those double-gate transistors, and the second control voltage input node is connected to the independent gates of the double-gate transistors of the remaining transistor stages for applying a second control voltage to dynamically control the threshold voltage of those double-gate transistors.

As mentioned above, in a charge-pump circuit, the charge at the output of a transistor stage is stored using a capacitor connected between that output stage and a control voltage. The charge-pump circuit according to the invention therefore preferably comprises an intermediate node for connecting the output or drain of a transistor stage to an input or source of a following transistor stage, and a plurality of capacitors connected in parallel between intermediate nodes of adjacent transistor stages and a first or second control voltage input node.

In one possible realisation of the charge-pump circuit according to the invention, the independent gate of the double-gate transistor of each transistor stage is connected to a first or second control voltage input node such that the independent gate of the transistor stage and the capacitor connected to the output of that transistor stage are connected to the same control voltage input node, and the independent gates of alternate transistor stages are connected to the first control voltage input node, while the independent gates of the remaining transistor stages are connected to the second control voltage input node. In other words, for a particular transistor stage, the same control voltage is applied to its independent gate as well as to the capacitor connected at the output of that stage. In this particularly simple embodiment, whose design is based on the known Dickson charge-pump, the control voltage applied to the independent gate of a conducting transistor is 'low', so that the threshold voltage for this conducting transistor is also correspondingly low, thus increasing the charge that can be transferred. For a transistor that is 'off', i.e. for a transistor whose source potential is lower than its drain potential, the control voltage applied to the independent gate is 'high', so that the threshold voltage for this non-conducting transistor is increased, thus allowing this transistor to be effectively turned 'off' as well as essentially eliminating the leakage current back through the transistor.

The charge-pump circuit according to the invention is not limited to the simpler Dickson-type charge-pump described above in which each transistor stage comprises a diode-connected multiple-gate MOSFET. In another embodiment of the invention, therefore, a transistor stage can preferably comprise a conventional single-gate MOSFET acting as a diode and connected in parallel with a double-gate transistor acting as a charge-transfer switch (CTS). In this circuit, the gain across each transistor stage can be increased considerably, since the lowest voltage of a transistor stage corresponds to the highest voltage of the preceding stage.

The output of a transistor stage is used to turn on or off the charge-transfer switch of the preceding stage. Since the charge-transfer switch is a multiple-gate transistor, a voltage applied to the independent gate may be used to (dynamically) adjust the threshold voltage. Therefore, in another preferred embodiment of the invention, the independent gate of the double-gate transistor of the transistor stage is connected to a first or second control voltage input node such that the independent gate of the transistor stage and the capacitor connected to the output node of that transistor stage are connected to different control voltage input nodes, and the independent gates of alternate transistor stages are connected to the first control voltage input node, while the independent gates of the remaining transistor stages are connected to the second control voltage input node, and wherein the output node of an alternate transistor stage is connected to the first gate of the double-gate transistor of the preceding transistor stage.

This preferred embodiment allows a more efficient realisation of the charge-pump circuit using static charge-transfer switches. In conventional circuits, the charge-transfer switches cannot be properly turned off, so that leakage current back through the charge-transfer switches resulted in a lower boosted output voltage. In the method according to the invention, by using multiple-gate MOSFETs for the charge-transfer switches and by adjusting their threshold voltages, these can effectively be turned off when required. Therefore, the boosted output voltage attainable by the charge-pump circuit according to the invention is advantageously greater than that achievable by comparable prior art circuits.

This makes the charge-pump circuit according to the invention particularly suitable for low-voltage applications. Therefore, in a charge-pump circuit according to the invention, a supply voltage applied to an input node of the circuit is preferably in the range 1 V to 1.1 V, more preferably in the range 0.9 V to 1 V, and most preferably in the range 0.8 V to 0.9 V. The power dissipated by the charge-pump circuit according to the invention preferably lies in the range 4-5 µW, more preferably in the range 3-4 µW, and most preferably in the range 1-2 µW.

One example of such a low-voltage application is a passive radio-frequency identifier (RFID) tag or smart card. Such devices are not connected to a power supply, but must derive a power supply from a radio-frequency signal received at an antenna. Evidently, the energy contained in such a signal is low. Therefore, these devices generally avail of a charge-pump circuit to boost the voltage derived from a rectification and smoothing of the AC signal delivered at the antenna output to give a low DC input signal which must then be boosted in order to power the circuitry contained in the device, for example logic modules, a memory, a modulator, etc.

Therefore, a radio-frequency communications circuit according to the invention comprises an antenna for receiving and/or transmitting a radio-frequency signal, a supply voltage source for providing a supply voltage, circuit modules for processing signals generated in the radio-frequency circuit, and a charge pump circuit according to any of the embodiments described above for boosting the supply voltage to provide a boosted voltage to the circuit modules. By using a charge pump circuit according to the invention, a greater boosted voltage can be obtained using a realisation considerably simpler than conventional charge-pump circuits.

The charge-pump circuit according to the invention could also be used for other applications, for example in memory circuits requiring relatively high voltage pulses in order to clear bits of the memory before writing, or in power-management circuits for supplying different levels of power depending on whether a device is to be powered in a standby or in an active mode.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

FIG. 1b shows a pair of control voltage signals for pumping charge in the charge-pump circuit of FIG. 1a;

FIG. 1c shows the voltage levels at a first node and at a second node in the charge-pump circuit of FIG. 1a;

FIG. 3b shows the voltage levels at a first node and at a second node in the charge-pump circuit of FIG. 3a;

FIG. 5b shows the voltage levels at a first node, at a second node, and at a third node in the charge-pump circuit of FIG. 5a;

In the drawings, like numbers refer to like objects throughout. Objects in the diagrams are not necessarily drawn to scale.

DETAILED DESCRIPTION OF THE EMBODIMENTS

Figure 1A:
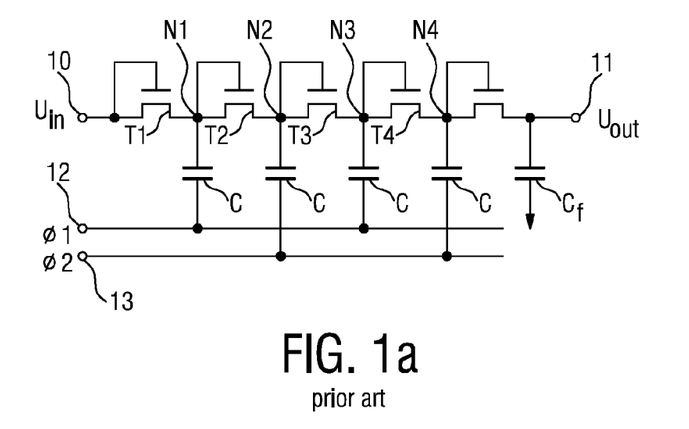
FIG. 1a shows a prior art Dickson charge-pump.

FIG. 1 shows a state-of-the-art Dickson charge-pump circuit comprising a series of transistor stages. Each transistor stage includes a transistor T1, T2, T3, T4, typically a MOSFET, whose drain is connected to the source of the transistor of the next stage and to a capacitor C, which is also connected to a control voltage node 12, 13. An input supply voltage $U_{in}$ is applied at an input node 10. First and second control voltage signals $\Phi_1$, $\Phi_2$ are applied at first and second control voltage input nodes 12, 13 respectively. A capacitor $C_f$ at the output node 11 serves to reduce the ripple on the output voltage $U_{out}$.

The output boosted voltage $U_{out}$ is dependent on a number of factors, such as the number of transistor stages, the capacitance of the capacitors C, the level of the input voltage $U_{in}$, and the highest level $U_{phi}$ of the control voltage signals $\Phi_1$, $\Phi_2$, the frequency of the control voltage signals $\Phi_1$, $\Phi_2$ etc. The capacitors C are generally chosen to have the same value, but the skilled person will appreciate that this is not a requirement.

Figure 1B:
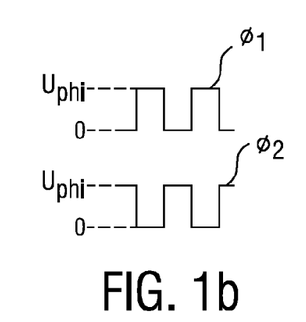

Basically, the Dickson charge-pump works as follows: charge is pumped into the capacitors by the control voltage signals $\Phi_1$, $\Phi_2$, also referred to as 'pumping clocks'. The control voltage signals $\Phi_1$, $\Phi_2$ are square wave signals of opposite phase between a value of 0 Volts and $U_{phi}$, as shown in FIG. 1b. By appropriate choice of the control voltage level $U_{phi}$, and by alternately charging and discharging the capacitors, the transistor diodes T1, T2, T3, T4 are alternately turned on or off to transfer charge along the chain of transistor stages.

Figure 1C:
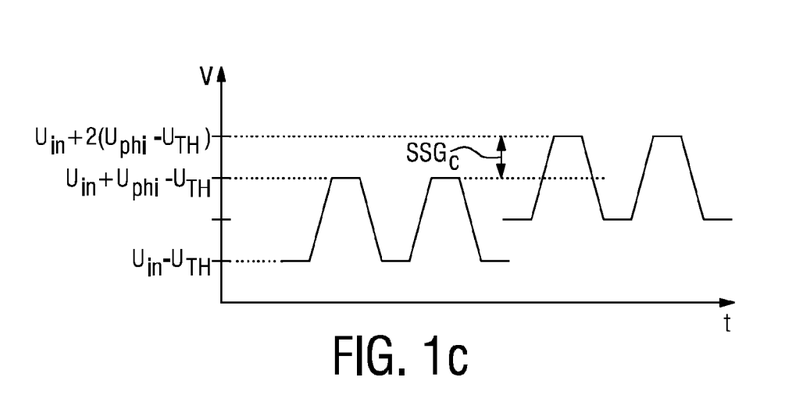

FIG. 1c shows the voltages at the output nodes of the first two transistors T1, T2 in the charge-pump circuit of FIG. 1a, viewed from left to right. When the first control voltage signal $\Phi_1$ is low, the first transistor T1 is conducting, so that the voltage U1 at node N1 becomes $$U1 = U_{in} - U_{TH} \quad (1)$$

since the voltage at the first transistor's source is $U_{in}$, and the voltage $U_{TH}$ is the threshold voltage or forward bias voltage of the transistor diode (it is assumed that each transistor T1, T2, T3, T4 has the same threshold voltage). When the first control voltage signal $\Phi_1$ goes high, the second control voltage signal $\Phi_2$ goes low, so that the first transistor T1 is off, and the second transistor T2 is conducting. The voltage at node N1 is now $$U1 = U_{in} - U_{TH} + U_{phi} = U_{in} + (U_{phi} - U_{TH}) \quad (2)$$

since the charge given by equation (1) was stored by the capacitor and increased by the first control voltage. When the first control voltage signal $\Phi_1$ goes low again, the second control voltage signal $\Phi_2$ goes high, so that the voltage at node N2 is increased by the amount of charge $U_{phi}$ pumped onto the capacitor connected to that node:

$$U2 = U_{in} + (U_{phi} - U_{TH}) - U_{TH} \quad (3)$$

Once again, when the first control voltage signal $\Phi_1$ goes low, and the second control voltage signal $\Phi_2$ goes high, the second transistor T2 is turned off and the capacitor connected to node N2 is charged by an additional amount $U_{phi}$, so that the voltage U2 at node N2 becomes $$U2 = U_{in} + 2 \cdot (U_{phi} - U_{TH}) \quad (4)$$

This principle applies to the following transistor stages, so that, the voltage at the output of an n-th transistor stage can be written as $$Un = U_{in} + n \cdot (U_{phi} - U_{TH}) - U_{TH} \quad (5)$$

Obviously, the actual useful voltage $U_{out}$ at the output will be reduced by the output load as well as by stray capacitances of the circuit. However, for the purposes of the discussion, it will be pointed out that the threshold voltage $U_{TH}$ places a considerable restriction on the attainable voltage output $U_{out}$, since the single stage gain $SSG_c$ for each transistor stage in this conventional charge pump circuit is given by $$SSG_c = U_{phi} - U_{TH} \quad (6)$$

Usually, the amplitude $U_{phi}$ of the control signal is essentially the same as the supply voltage level $U_{in}$. Obviously, for a low supply voltage level such as in a radio-frequency tag, the negative influence of the threshold voltage $U_{TH}$ becomes more pronounced.

Figure 2:
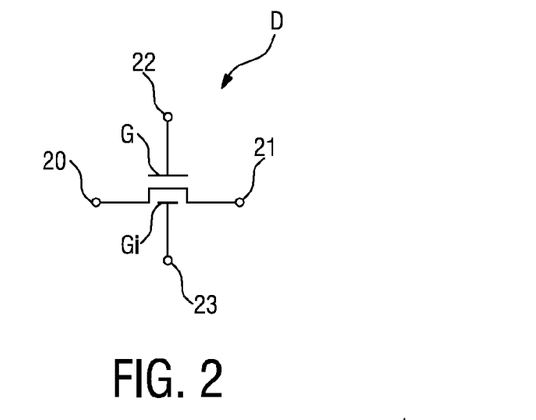
FIG. 2 shows a circuit symbol for a double-gate FinFET.

FIG. 2 shows a circuit symbol for a double-gate field-effect transistor D with independent gates, such as a FinFET. This type of transistor D has the usual source terminal 20 and drain terminal 21. In addition to a gate terminal 22 connected to a first gate G, the double-gate FinFET D also has an additional gate terminal 23 connected to an independent second gate $G_i$. By means of this additional gate terminal 23, a low or high voltage can be applied as required to the independent gate in order to either increase or decrease the threshold voltage of the device.

Figure 3A:
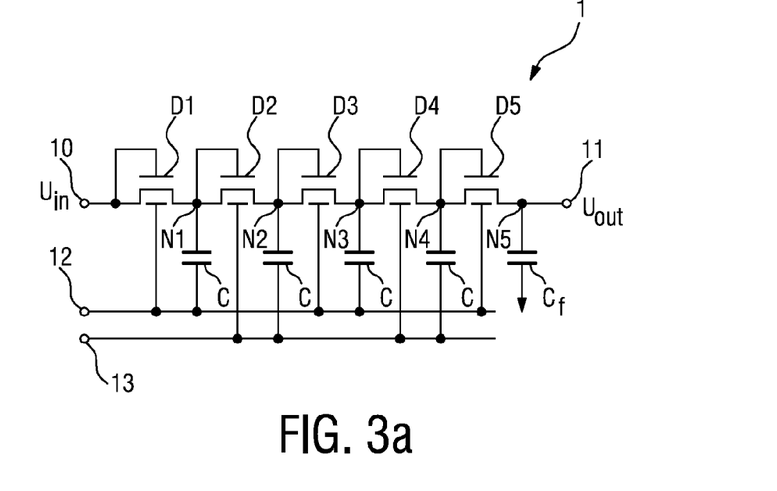
FIG. 3a shows a first embodiment of a charge-pump circuit according to the invention.

FIG. 3a shows a first embodiment of the charge-pump circuit 1 according to the invention, in which the problem of the threshold voltage is dealt with in a simple and effective manner. Here, a chain of double-gate transistor diodes D are connected in a series of transistor stages with a parallel arrangement of capacitors C, similar to the circuit of FIG. 1. In this diagram, the transistor diodes D are double-gate FinFETs, each with a first gate G and a second (independent) gate $G_i$ which can be controlled separately from the first gate G, as illustrated in FIG. 2 above. For the sake of clarity, these gates have not been explicitly labelled in the diagram. The independent gates of the FinFETs D of the transistor stages are connected to either the first control voltage input 12 or to the second control voltage input 13. Here, the first, third and fifth FinFETs D1, D3, D5 (viewed from left to right in the diagram in the direction of charge transfer) are connected by means of their independent gates to the first control voltage input 12, and the second and fourth FinFETs D2, D4 are connected by means of their independent gates to the second control voltage input 13.

The principle of operation of this circuit is as follows: An input voltage $U_{in}$ is applied at the voltage input node 10, and first and second control voltage signals $\Phi_1$, $\Phi_2$ are applied at the first and second control voltage inputs 12, 13 respectively. When the first control voltage $\Phi_1$ applied at the first control voltage input node 12 is low (0 Volts), the first FinFET D is conducting. Furthermore, since the voltage applied to the second gate of the first FinFET D is the first control voltage $\Phi_1$ and therefore also low, the threshold voltage of this FinFET is decreased so that the voltage at the first node N1 is given by $$U1 = U_{in} - U_{min} \quad (1')$$

After pumping charge onto the capacitor C at the output of the first stage, the voltage at the first node N1 increases to:

$$U1 = U_{in} + (U_{phi} - U_{min}) \quad (2')$$

For this circuit, therefore, the voltage at the n-th node after charge has been pumped onto its output capacitor C can be expressed as $$U2 = U_{in} + n \cdot (U_{phi} - U_{min}) - U_{min} \quad (5')$$

and the improved single stage gain SSG can be expressed as $$SSG = U_{phi} - U_{min} \quad (6')$$

where the decreased threshold voltage $U_{min}$ is considerably less than the threshold voltage $U_{TH}$ of a conventional diode MOSFET.

Figure 3B:
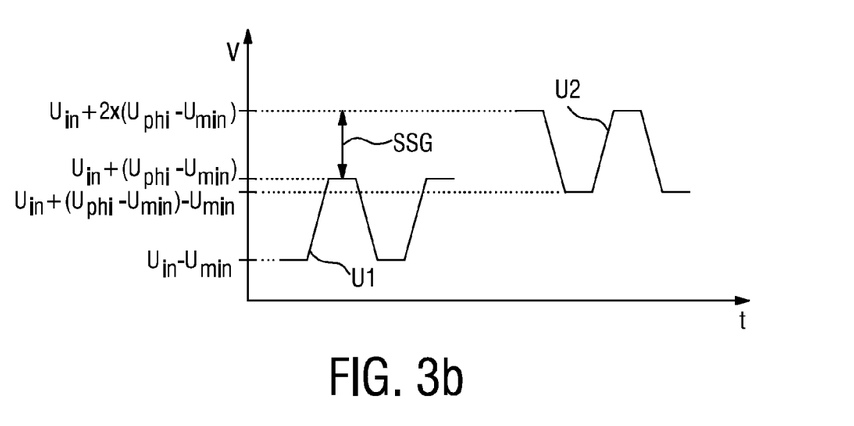

The voltages at the first and second nodes N1, N2 for the improved Dickson charge-pump of FIG. 3a are shown in FIG. 3b. Since the single stage gain SSG is greater than the single stage gain $SSG_c$ of the conventional Dickson charge-pump circuit, the boosted voltage $U_{out}$ available at the output node 11 is correspondingly greater. The efficiency achieved by the charge-pump circuit 1 shown can be up to 40%, which is considerably better than the 18%-20% which can be achieved by a comparable conventional circuit.

Figure 4:
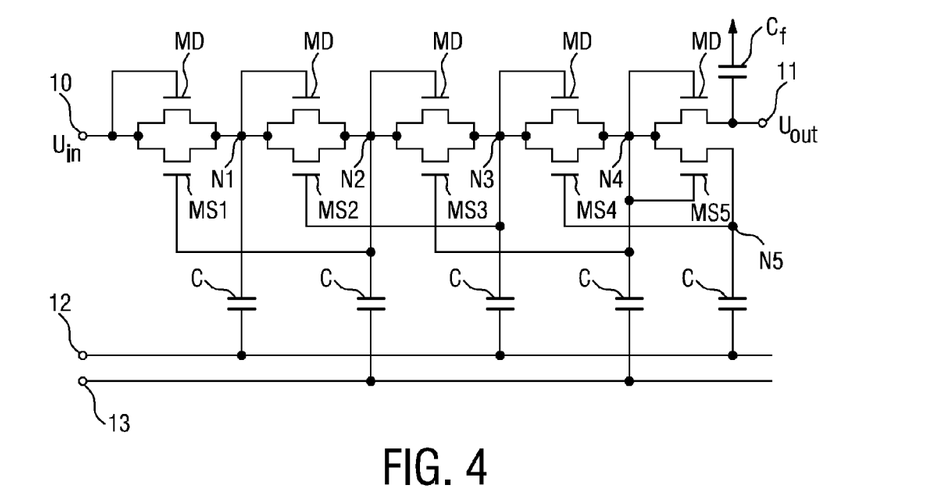
FIG. 4 shows a prior art charge-pump circuit using charge-transfer switches.

FIG. 4 shows a prior-art charge-pump circuit for boosting an input voltage $U_{in}$ to give an output voltage $U_{out}$ using transistor stages, each with a diode transistor MD and an additional transistor MS1, MS2, MS3, MS4, MS5 acting as a charge-transfer switch. The behaviour of the circuit can be summarized as follows: transistor diodes MD set the voltage at each pumping node N1, N2, N3, N4, N5, but are not involved in the pumping itself. The voltages at the nodes N2, N3, N4, N5 are used to control the charge-transfer switches MS1, MS2, MS3, MS4 of the previous stages. The charge-transfer switches MS1, MS2, MS3, MS4, MS5 are turned on and off by the corresponding pumping clock or control voltage signals $\Phi_1$, $\Phi_2$, allowing the charge to be pushed only in one direction. The operation of this circuit is described clearly in the paper by Wu and Chang referred to in the introduction, and need not be explained in more detail here.

Basically, there is no explicit dependence on the threshold voltage in this circuit, and, for an input supply voltage $U_{in}$, the voltage $U_n$ at an output node of a transistor stage can be expressed as $$U_n = U_{in} + n \cdot \Delta V \quad (7)$$

where $\Delta V$ is a function of the control voltage level $U_{phi}$, the capacitances C, any stray capacitance, the frequency of the control voltage signals, and the current through a load at the output of the charge-pump. Obviously, $\Delta V$ must be greater than a threshold voltage of the charge-transfer switch in order for the circuit to function. However, this circuit is not entirely ideal, since the charge-transfer switches MS1, MS2, MS3, MS4 cannot be completely switched off owing to two conflicting requirements of the threshold voltage, as explained in the paper by Wu and Chang referred to in the introduction. In brief, the threshold voltage must simultaneously be greater than twice $\Delta V$ while also being less than twice $\Delta V$. Since this requirement evidently cannot be satisfied, the charge-transfer switches cannot be properly turned off, leading to leakage current, so that the achievable output voltage is in fact less than predicted, since the single stage gain $\Delta V$ cannot be achieved.

Figure 5A:
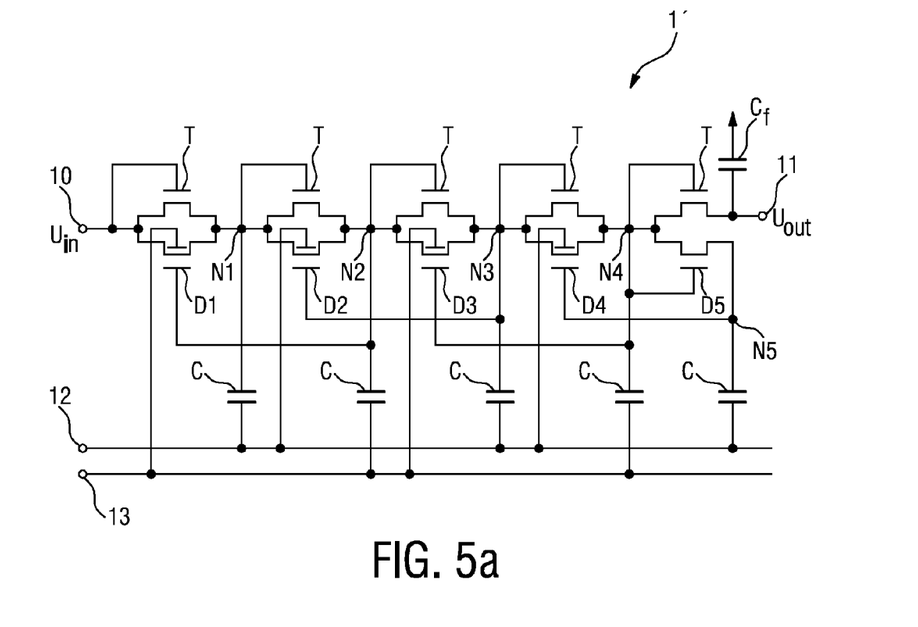
FIG. 5a shows a second embodiment of a charge-pump circuit according to the invention.

FIG. 5a shows an alternative charge-pump circuit 1' according to the invention, using charge-transfer switches D1, D2, D3, D4, D5 in a chain of transistor stages to boost an input voltage $U_{in}$ to an output voltage $U_{out}$. Again, the operation of this circuit 1' is, in principle, the same as in FIG. 4 above. However, in this embodiment of the invention, the charge-transfer switches D1, D2, D3, D4 are double-gate MOSFETs with independent gates. The charge-transfer switch D5 is shown here as a conventional MOSFET, owing to the different phases of the control voltage signals $\Phi_1$, $\Phi_2$, but could equally well be the same type of double-gate device as the other transistors D1, D2, D3, D4. Each independent gate of the charge-transfer switches D1, D2, D3, D4 is connected to one or other of the control voltage input nodes 12, 13, such that the independent gates of a first set of charge-transfer switches, comprising the second and fourth charge-transfer switches D2, D4, are connected to the first control voltage $\Phi_1$, and the independent gates of a second set of charge-transfer switches, comprising the first, and third charge-transfer switches D1, D3 are connected to the second control voltage $\Phi_2$.

The principle of operation of this circuit 1' is essentially the same as that described in the paper by Wu and Chang, but with the important improvement offered by the additional independent gate of the FinFET charge-transfer switches D1, D2, D3, D4: when the first control voltage $\Phi_1$ goes high, the charge-transfer switches D1, D3 of the second set of charge-transfer switches are completely switched off. Similarly, when the second control voltage $\Phi_2$ goes high, the charge-transfer switches D2, D4 of the first set of charge-transfer switches are completely switched off. Therefore, the requirements that could not be fulfilled by the prior art CTS charge-pump circuit are of no consequence in the charge-pump circuit 1' according to the invention.

Figure 5B:
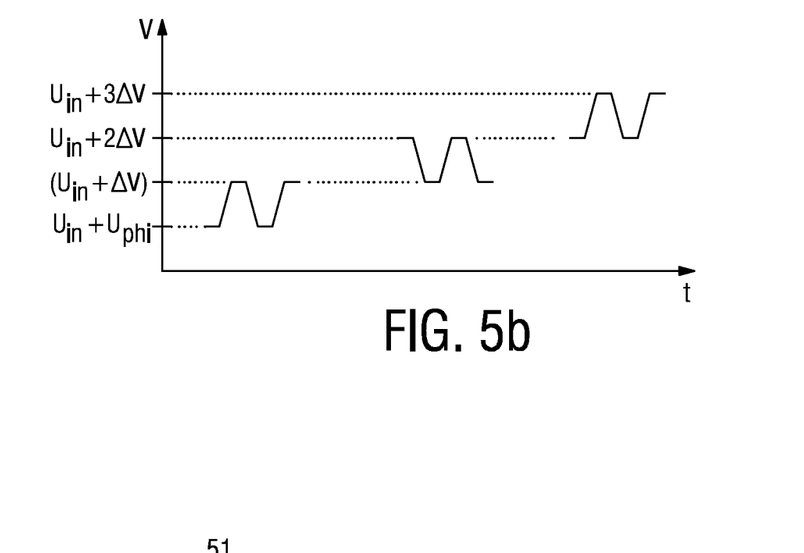

FIG. 5b shows the voltages at the output nodes N1, N2, N3 of the first three transistor stages of the circuit of FIG. 5a. As the graph clearly shows, charge can be transferred from stage to stage, increasing at each stage by the amount $\Delta V$. Therefore, using this charge-pump circuit 1', a satisfactorily high level of boosted output voltage $U_{out}$ can be achieved.

Figure 6:
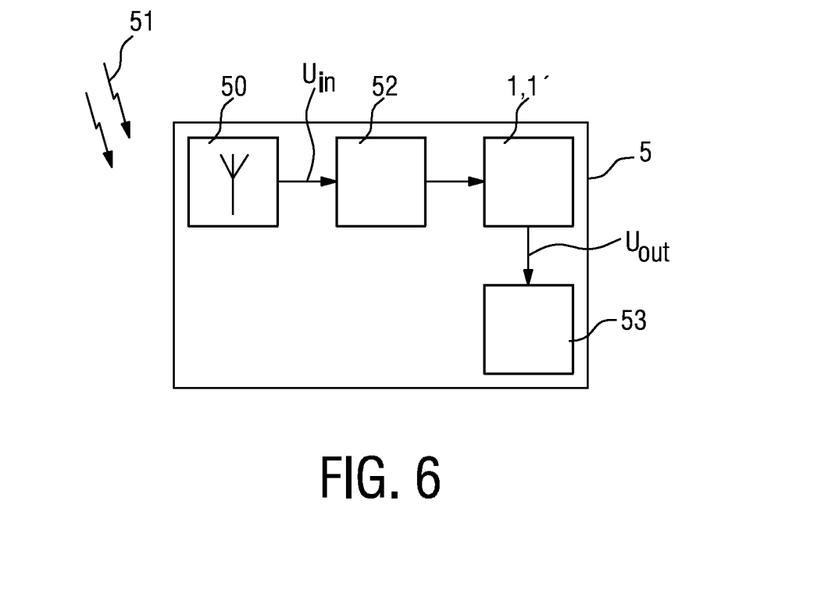
FIG. 6 shows an embodiment of a radio-frequency communications circuit according to the invention.

FIG. 6 shows a realisation of a passive radio-frequency identifier tag 5, with an antenna 50 for receiving and transmitting a radio-frequency signal 51. The received AC signal is rectified and smoothed in a rectifier circuit 52 to give a (weak) DC signal $U_{in}$. This signal $U_{in}$ is then boosted in a charge-pump circuit 1, 1' according to either of the embodiments described above. The choice of charge-pump circuit 1, 1' can depend on the desired level of boosted voltage, for instance. The boosted voltage $U_{out}$ is then passed to any circuit modules 53 that require this higher DC voltage.

Although the present invention has been disclosed in the form of preferred embodiments and variations thereon, it will be understood that numerous additional modifications and variations could be made thereto without departing from the scope of the invention. For instance, in the charge-pump circuit according to the invention, any number of transistor stages could be used. It is also conceivable that one or more of these transistor stages comprises a conventional transistor such as a MOSFET with a single gate.

For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A charge-pump circuit, comprising
a supply voltage input node for applying an input voltage to be boosted;
a boosted voltage output node for outputting a boosted voltage;
a plurality of transistor stages connected in series between the supply voltage input node and the boosted voltage output node;
and wherein at least one transistor stage comprises a multiple-gate transistor, which transistor comprises at least a first gate and a second gate, of which the first gate is realized for switching the transistor on or off according to a voltage applied to the first gate, and the second gate is realized for dynamically controlling the threshold voltage of the multiple-gate transistor, independently of the first gate, according to a control voltage applied to the second gate, wherein the charge-pump circuit comprises a first control voltage input node for applying a first control voltage, a second control voltage input node for applying a second control voltage, an intermediate node for connecting the output of a transistor stage, which is connected to a source terminal or a drain terminal of a multiple-gate transistor of the transistor stage, to an input of a following transistor stage, which is connected to a source terminal or a drain terminal of a multiple-gate transistor of the following transistor stage, and a plurality of capacitors connected in parallel between intermediate nodes of adjacent transistor stages and the first or second control voltage input node, wherein the second gate of a particular transistor stage and the capacitor connected to the output of that particular transistor stage are connected to the same control voltage input node, wherein a supply voltage applied to an input node of the circuit is in the range 1 V to 1.1 V or the power dissipated by the circuit lies in the range 4-5 μW.

2. A charge-pump circuit according to claim 1, wherein each transistor stage of the plurality of transistor stages comprises a multiple-gate transistor with a first gate and a second gate.

3. A charge-pump circuit according to claim 1, wherein the multiple-gate transistor comprises a FinFET transistor.

4. A charge-pump circuit according to claim 1, wherein the first and second control voltages comprise essentially square-wave signals of opposite phase.

5. A charge-pump circuit according to claim 1, comprising a plurality of transistor stages each with a multiple-gate transistor, and wherein the first control voltage input node is connected to the second gates of the multiple-gate transistors of alternate transistor stages for application of a first control voltage to control the threshold voltage of those multiple-gate transistors of the alternate transistor stages, and the second control voltage input node is connected to the second gates of the multiple-gate transistors of the remaining transistor stages for application of a second control voltage to control the threshold voltage of those multiple-gate transistors of the remaining transistor stages.

6. A charge-pump circuit according to claim 1, wherein the second gates of the multiple-gate transistors of the transistor stages are connected to a first or second control voltage input node such that
the second gates of the multiple-gate transistors of alternate transistor stages are connected to the first control voltage input node, while the second gates of the multiple-gate transistors of the remaining transistor stages are connected to the second control voltage input node.

7. A charge-pump circuit according to claim 1, wherein the supply voltage applied to the input node of the circuit is in the range 1 V to 1.1 V.

8. A charge-pump circuit according to claim 1, wherein the power dissipated by the circuit lies in the range 4-5 μW.

9. A radio-frequency communication device comprising:
an antenna for receiving and/or transmitting a radio-frequency signal,
a rectifier module for providing a supply voltage,
circuit modules for processing signals generated in the radio-frequency communication device,
and a charge pump circuit according to claim 1 for boosting the supply voltage to provide a boosted voltage to the circuit modules.

10. A method of boosting a voltage using a charge-pump circuit
comprising a plurality of transistor stages connected in series between a supply voltage input node and a boosted voltage output node, wherein at least one transistor stage comprises a multiple-gate transistor with at least two gates, of which one is a first gate for switching the transistor on or off according to a voltage applied to the first gate, and one is an additional second gate for dynamically controlling the threshold voltage of the multiple-gate transistor, independently of the first gate, according to a control voltage applied to the second gate, which method comprises
applying an input voltage to be boosted at the supply voltage input node;
applying a control voltage to the second gate of the multiple-gate transistor to control the threshold voltage of the multiple-gate transistor; and
outputting a boosted voltage at the voltage output node, wherein each of a plurality of transistor stages of the charge-pump circuit comprises a multiple-gate transistor, and wherein the method comprises applying a first control voltage at a first control voltage input node connected to the second gates of multiple-gate transistors in a first set of transistor stages and applying a second control voltage at a second control voltage input node connected to the second gates of multiple-gate transistors in a second set of transistor stages to control the threshold voltages of the transistors in the plurality of transistor stages, wherein the method comprises connecting the output of a transistor stage, which is connected to a source terminal or a drain terminal of a multiple-gate transistor of the transistor stage, to an input of a following transistor stage, which is connected to a source terminal or a drain terminal of a multiple-gate transistor of the following transistor stage, through an intermediate node, connecting a plurality of capacitors in parallel between intermediate nodes of adjacent transistor stages and the first or second control voltage input node, and connecting the second gate of a particular transistor stage and the capacitor that is connected to the output of that particular transistor stage to the same control voltage input node, wherein a supply voltage applied to an input node of the circuit is in the range 1 V to 1.1 V or the power dissipated by the circuit lies in the range 4-5 μW.

11. A radio-frequency communication device comprising:
an antenna for receiving and/or transmitting a radio-frequency signal,
a rectifier module for providing a supply voltage,
circuit modules for processing signals generated in the radio-frequency communication device,
and a charge pump circuit for boosting the supply voltage to provide a boosted voltage to the circuit modules, the charge-pump circuit comprising
a supply voltage input node for applying an input voltage to be boosted;
a boosted voltage output node for outputting the boosted voltage;
a plurality of transistor stages connected in series between the supply voltage input node and the boosted voltage output node;
and wherein at least one transistor stage comprises a multiple-gate transistor, which transistor comprises at least a first gate and a second gate, of which the first gate is realized for switching the transistor on or off according to a voltage applied to the first gate, and the second gate is realized for dynamically controlling the threshold voltage of the multiple-gate transistor, independently of the first gate, according to a control voltage applied to the second gate, wherein the charge-pump circuit comprises a first control voltage input node for applying a first control voltage, a second control voltage input node for applying a second control voltage, an intermediate node for connecting the output of a transistor stage, which is connected to a source terminal or a drain terminal of a multiple-gate transistor of the transistor stage, to an input of a following transistor stage, which is connected to a source terminal or a drain terminal of a multiple-gate transistor of the following transistor stage, and a plurality of capacitors connected in parallel between intermediate nodes of adjacent transistor stages and the first or second control voltage input node, wherein the second gate of a particular transistor stage and the capacitor connected to the output of that particular transistor stage are connected to the same control voltage input node.

* * * * *